United States Patent [19]

Morse

[11] Patent Number: 5,518,445

[45] Date of Patent: May 21, 1996

[54] SHRIMP PROCESSING ARRANGEMENT

[76] Inventor: Charles H. Morse, 25 Crescent Ave., Beverly, Mass. 01915

[21] Appl. No.: 366,802

[22] Filed: Jan. 3, 1995

[51] Int. Cl.$^6$ ................................................. A22C 29/02
[52] U.S. Cl. .................... 452/185; 452/2; 452/187; 269/43
[58] Field of Search ...................... 452/185, 186, 452/187, 193, 198, 1–4, 5, 6, 7; 269/37, 46, 43, 44, 130, 131, 266, 268, 270, 289, 901

[56] References Cited

U.S. PATENT DOCUMENTS

| | | | |
|---|---|---|---|
| 1,248,843 | 12/1917 | Gay | 452/187 |
| 1,677,579 | 7/1928 | Barry | 452/2 |
| 1,867,238 | 7/1932 | Vogt | 452/186 |
| 1,951,930 | 3/1934 | Harris | 452/186 |
| 2,567,586 | 9/1951 | Werder | 269/43 |
| 4,439,893 | 4/1984 | Betts | 17/72 |
| 4,494,277 | 1/1985 | Tolley et al. | 17/71 |

FOREIGN PATENT DOCUMENTS

| | | | |
|---|---|---|---|
| 3820480 | 5/1989 | Germany | 452/187 |
| 3933026 | 4/1990 | Germany | 452/186 |

*Primary Examiner*—Willis Little
*Attorney, Agent, or Firm*—Don Halgren

[57] ABSTRACT

The present invention comprises an elongated bar which is trough-shaped having side walls, at least one of which has a foodstuff securement arrangement such as slots placed therethrough, or a foldable panel attached thereto, so as to hold a foodstuff such as the tail of a shrimp securely therein. The elongated bar may also have a cover and end walls which all act to help enclose the secured portion of the foodstuff (shrimp) from any food processing operation.

15 Claims, 7 Drawing Sheets

SHRIMP PROCESSING ARRANGEMENT

BACKGROUND OF THE INVENTION

1. Field of the Invention

The invention relates to an arrangement for treating shrimp prior to their being packaged and distributed to the retailer/consumer.

2. Prior Art

In the shrimp processing industry, shrimp come in a large master carton weighing about fifty pounds, the carton containing ten five pound blocks of ice containing shrimp frozen therein. These frozen blocks of shrimp are loaded into a circulating tank to thaw. Those shrimp are then put on a screen table to permit them to drip dry.

The shrimp may then be soaked in a pre-batter for about an hour as a batch process, and then they are manually laid out individually, on a "pre-duster" conveyer belt. Once they have been predusted, they generally are individually manually realigned to a separate conveyer belt, so that butterfly shrimp may be spread out for breading and battering. As these shrimp are individually set out on the conveyer belt, a number of people are required to keep the shrimp in longitudinal alignment with the conveyer belt.

Once each of the individual shrimp have gone through the conveyer assembly for the batter, the dusting and breading, their tails may each be manually individually cleaned so as to remove the breading and batter and dusting therefrom.

The shrimp are then again, manually, individually placed in individual spaces on trays where they are frozen in a further package for shipment to the retailer/consumer.

The processing of food stuffs such as this, has yet to be fully mechanized. One such invention for processing food is shown in U.S. Pat. No. 4,494, 277 to Tolley et al., showing a device for holding a single crab during a processing thereof.

One other patent to Betts, U.S. Pat. No. 4,439,893 shows a conveyer system which transmits shrimp's bodies to a vertically arranged wheel having cammed gripping devices which enable the shrimp to be deviened. The shrimp, it is noted, in this patent, are placed on the conveyer line manually, into their trough-like supports for such processing.

It is an object of the present invention to provide an arrangement for improving the processing and shipping of foodstuffs such as shrimp, so as to minimize the manual labor involved.

It is an object of the present invention, to provide an arrangement which will keep multiple foodstuffs such as shrimp, properly aligned during a multi-stage process applied to the foodstuffs, and during subsequent handling/shipping thereof.

It is a further object of the present invention to provide an arrangement for handling foodstuffs such as shrimp, which will minimize wastage of any of the material which is applied onto those foodstuffs, such as shrimp or the like.

BRIEF SUMMARY OF THE INVENTION

The present invention involves a method of treating a plurality of foodstuffs such as shrimp, so as to arrange it in a support device, to minimize the manual handling of these foodstuffs and reducing the number of operations otherwise performed on these foodstuffs, such as shrimp.

The device for supporting these foodstuffs, such as shrimp, may comprise an elongated bar, made from a foldable material, such as metal but preferably of plastic. The elongated bar has enclosure portions disposed off of at least one side of the elongated bar. Each enclosure portion may be a generally flat rectangularly shaped piece of plastic panel material attached to the bar. Each planar piece of plastic material may be arranged to be rolled or formed or folded about the tail portion of a shrimp placed thereon. The enclosure portion acts to grip and support the tail of the shrimp therewithin, and also to grip and support the tail of the shrimp therewithin, and also to shield that same shrimp tail portion from any of the subsequent treating such as predusting, batter or breading that is normally applied to the body of the shrimp.

In one embodiment of the enclosure portion, the panels have a plurality of parallel riblike serration's thereon, so as to permit the panel to be folded in a cylindrical shape, which encloses the tail of the shrimp. The cylindrical enclosure is attached at one longitudinal end to the bar, which bar has a plurality of such cylindrical enclosures thereon. The elongated bar with its plurality of cylindrical enclosures, and tails of shrimp enclosed therewithin, would be put as a unit, onto a conveyer belt which would then take the plurality of shrimp and the elongated bar and their enclosures through the predusting process as well as the batter and breading while keeping such processing away from the tail of the shrimp being processed.

The same elongated bar enclosing the now processed shrimp bodies and tails, may be thereupon moved to a package which would contain the elongated bar, the enclosure portions and the shrimp themselves for packaging, freezing and shipment to the ultimate retailer/consumer. Thus, one elongated bar with its enclosure portions thereon, permits the shrimp to be handled only one, by the placement of the tails of the shrimp within the enclosure portions on the bar. Such enclosure portions thereby keep the shrimp parallel and in proper alignment during their processing. Such enclosures also permit the shrimp tails to avoid subsequent cleaning which is typical of the prior art.

Other embodiments of the elongated bar and enclosures may be made from a flat sheet of foldable flexible plastic, having a central extended portion with spaced apart transversely disposed formed elements on each side thereof. On one side of the extended central portion there is a formed trough like support housing. Opposite that support housing, on the other side of the elongated member, there is a flexibly articulable flap which may be folded over the trough shaped support portion once a shrimp has its tail placed therewithin.

The invention thus comprises a support arrangement for holding a plurality of foodstuffs in parallel alignment and partial enclosure during a food processing operation, comprising an elongated bar; a plurality of enclosure members attached to the elongated bar, each of the enclosure members arranged to securely hold and enclose at least part of one of said foodstuffs during the foodstuff processing operation. The enclosure members are formed from a generally planar element which may be folded around a foodstuff placed on said planar element. The planar element is arranged to be rolled up in a cylindrical shape to enclose at least a part of the foodstuffs. The generally planar element has a plurality of serrations thereon to facilitate gripping of the foodstuffs within the enclosure. The elongated bar has at least two opposite side edges, and each side edge has a panel extending therefrom, which opposed panels are foldable with respect to one another to form an enclosure member.

The invention also includes an arrangement for holding a plurality of foodstuffs in parallel alignment and partial enclosure during a processing operation, comprising: an elongated bar; a securement arrangement comprising the elongated bar for securing the foodstuffs with respect to the elongated bar and for covering, at least partially, the foodstuffs during the processing operation. The elongated bar comprises a trough-like enclosure which is arranged to receive a portion of the foodstuffs. The trough-like enclosure has a plurality of slots therein, the slots in the enclosure arranged to securely hold the foodstuffs therethrough. The trough-like enclosure has an arrangement of side walls, a lower portion bridging the side walls, and a cover, to provide the trough-like enclosure with protection on its upper side during any food processing operation steps of the bar and foodstuffs therewith. The cover has an elongated edge by which it is attached to one of the side walls. The cover is removably attached with respect to the elongated bar. A box-like housing is seated within the enclosure having an open end which is in alignment with the slot in the walls, to individually hold a foodstuff therein.

The invention also includes a method of processing a plurality of individual foodstuffs in a manner so as to keep said foodstuffs in proper alignment with one another, an at least partially covered from the processing operation, comprising: providing an elongated bar for holding said foodstuffs in alignment; placing foodstuffs in securement arrangements in the elongated bar; and placing the elongated bar with the foodstuffs therewith onto a conveyor line for processing; arranging a slot in the elongated bar so as to receive one of the foodstuffs; processing said foodstuffs in a series of food treating operations, while the foodstuffs extend outwardly away from the elongated bar, a portion of each of the foodstuffs also being enclosed within the elongated bar; shipping the processed treated foodstuffs while they are still secured with respect to the elongated bar; covering the elongated bar with an elongated cover to enclose the portions of the foodstuffs within the elongated bar from food processing operations and to secure the foodstuffs therein for subsequent handling and shipping pivoting the elongated cover about an elongated edge by which it is formed with the elongated bar, into a snap-on engagement over the enclosure bar to hold the cover thereon.

Thus what has been shown is a novel and unique arrangement for processing of foodstuffs such as shrimp, portions of which have to be maintained free of the process being applied to the rest of the foodstuff. The present arrangement also keeps them in alignment and permits a minimum of manual handling of the foodstuffs while also permitting the support device to define the packaging arrangement for that foodstuff as well.

BRIEF DESCRIPTION OF THE DRAWINGS

The objects and advantages of this invention will become more apparent when viewed in conjunction with the following drawings, in which:

FIG. 6 is a view similar to FIG. 5, with the cap mated accordingly; and.

Description of the Preferred Embodiments

Figure 1:
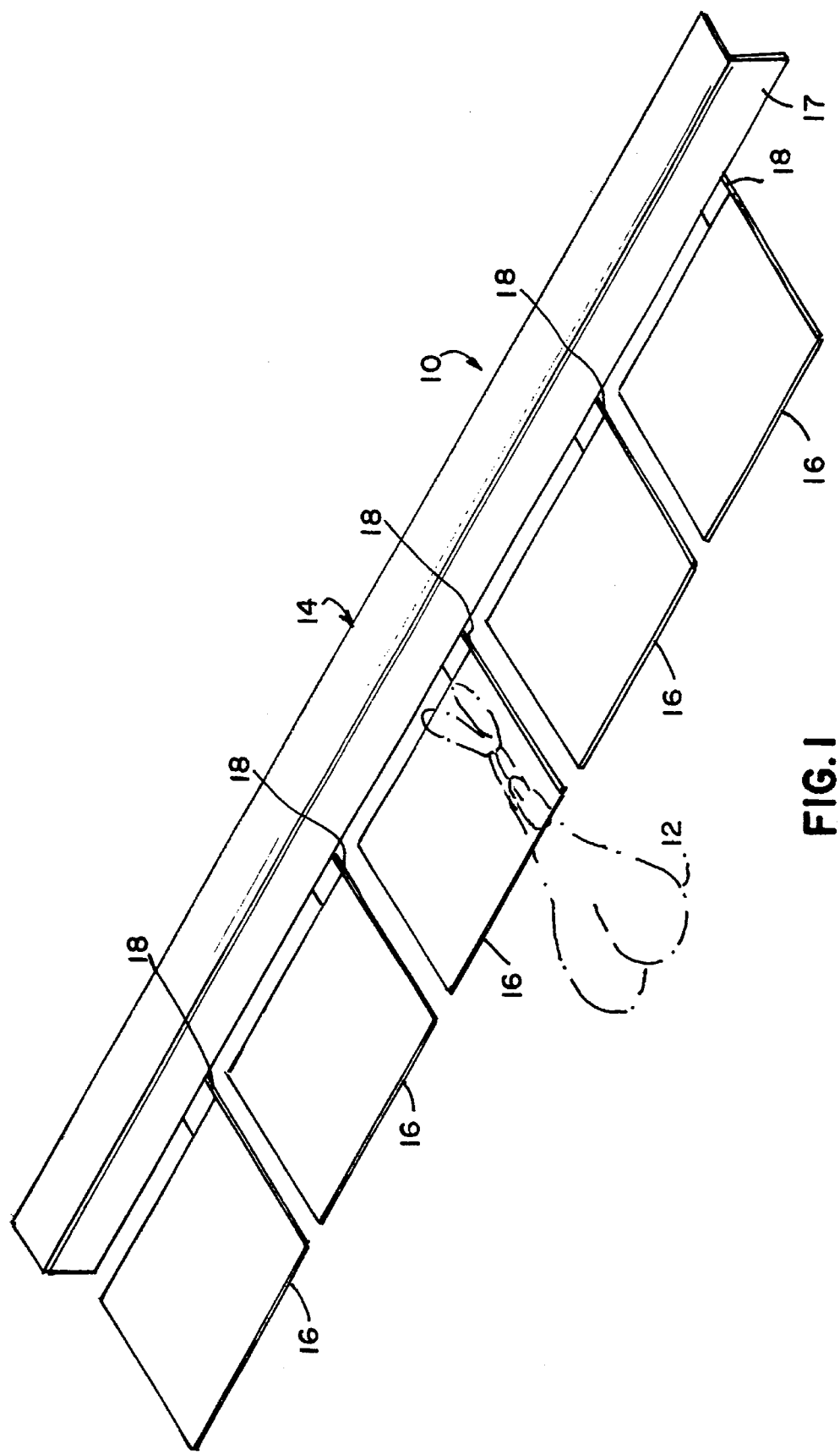
FIG. 1 is a plan view of an elongated bar having foodstuff support members shown thereon in a nongripping orientation.

The present invention involves a method and apparatus for treating a plurality of foodstuffs 12, such as shrimp, so as to arrange it in a support device 10, as shown in FIG. 1, to minimize the manual handling of these foodstuffs 12 and reducing the number of operations otherwise performed on these foodstuffs 12, shown in phantom in FIG. 1.

The device 10 for supporting these foodstuffs 12, such as shrimp, may comprise an elongated bar 14, made from a thin, foldable material, such as metal or cardboard, but preferably of plastic. The elongated bar 14 has enclosure portions 16 disposed off of at least one side 17 of the elongated bar 14. Each enclosure portion 16 may be a generally flat, thin, panel-like, rectangularly shaped piece of plastic material attached to the bar 14, by a connector such as a connecting tab 18. Each planar piece of plastic material may be arranged to be rolled or formed or folded about the tail portion of a shrimp 12 ( or one end portion of the foodstuff) placed thereon. The enclosure portion 16 acts to grip and support the tail of the shrimp therewithin, and also to shield that same shrimp tail portion from any of the subsequent treating operations such as predusting, battering or breading that is normally applied to the body of the shrimp. The enclosures 16 act to keep the shrimp 12 (or one end portion of the foodstuff) in an orderly, non-conflicting parallel alignment with one another during the processing, packaging and shipping.

Figure 2:
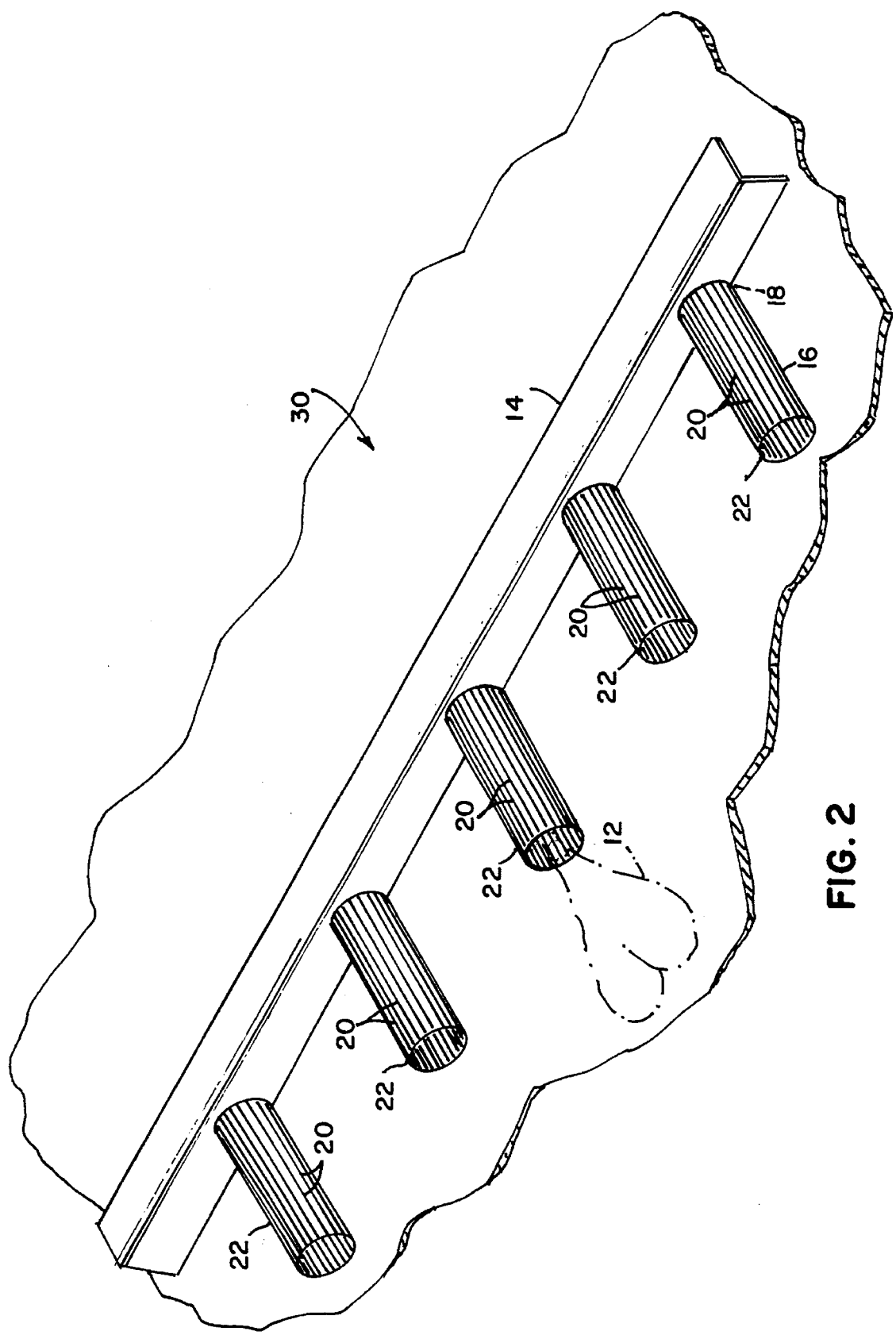
FIG. 2 is a perspective view of the elongated bar and support arrangement shown in FIG. 1, with the support members configured so as to support and shield the foodstuff being carried therewithin.

In one embodiment of the enclosure portion 16, as shown in FIG. 2, the panels have a plurality of parallel rib-like serrations 20 thereon, so as to permit the panel to be easily folded into a securement such as a cylindrical enclosure 22, which encases and holds the tail of the shrimp 12. The cylindrical enclosure 12 is attached at one longitudinal end, at the aforementioned tab 18, to the bar 14, which bar 14 may have a plurality of such cylindrical enclosures 22 thereon. The elongated bar 14 with its plurality of cylindrical enclosures 22, and tails of shrimp enclosed therewithin, would be put as a unit, onto a conveyer belt 30 which would then take the plurality of shrimp and the elongated bar and their enclosures through the steps, (not shown), of the predusting process as well as the battering and breading operations while keeping such processing away from the tail of the shrimp being processed.

The same elongated bar 14 enclosing the now processed shrimp bodies and their tails, may be thereupon collectively moved to a shipping package (also not shown), which would contain the elongated bar 14, the enclosure portions and the shrimp themselves for packaging, freezing and shipment to the ultimate retailer and/or consumer. Thus, one elongated bar 14 with its enclosure portions 22 thereon, permits the individual shrimps to be handled only once, by the placement of the tails of the shrimp within the enclosure securement portions on the elongated bar 14. Such enclosure portions thereby keep the shrimp parallel and in proper alignment during their processing and their subsequent handling and shipping as well. Such enclosures also permit the shrimp tails to avoid the need for subsequent cleaning/ treatment which typical of the prior art.

Figure 3:
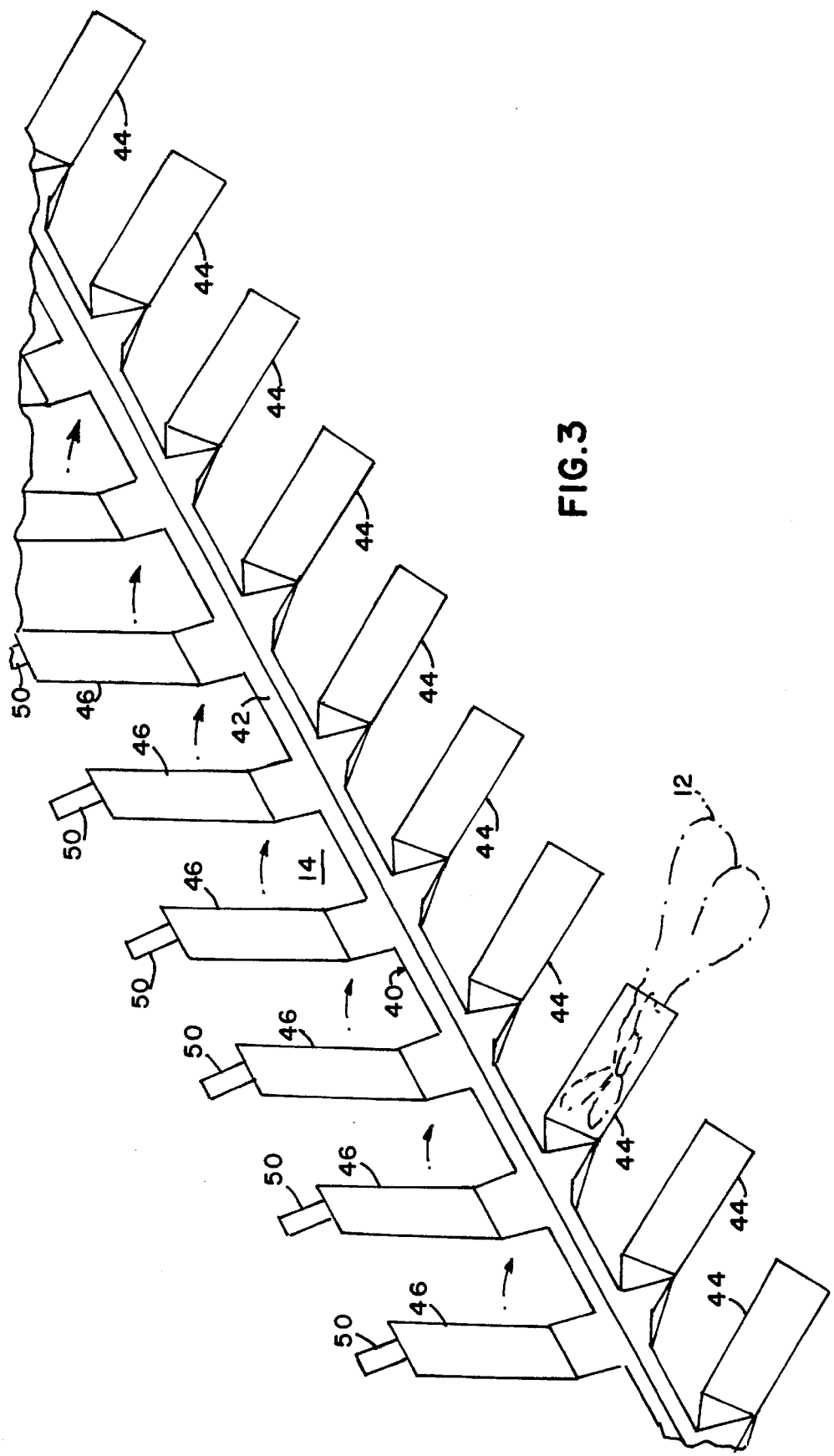
FIG. 3 is a further embodiment of the support arrangement shown in FIG. 1, in an open configuration.
Figure 4:
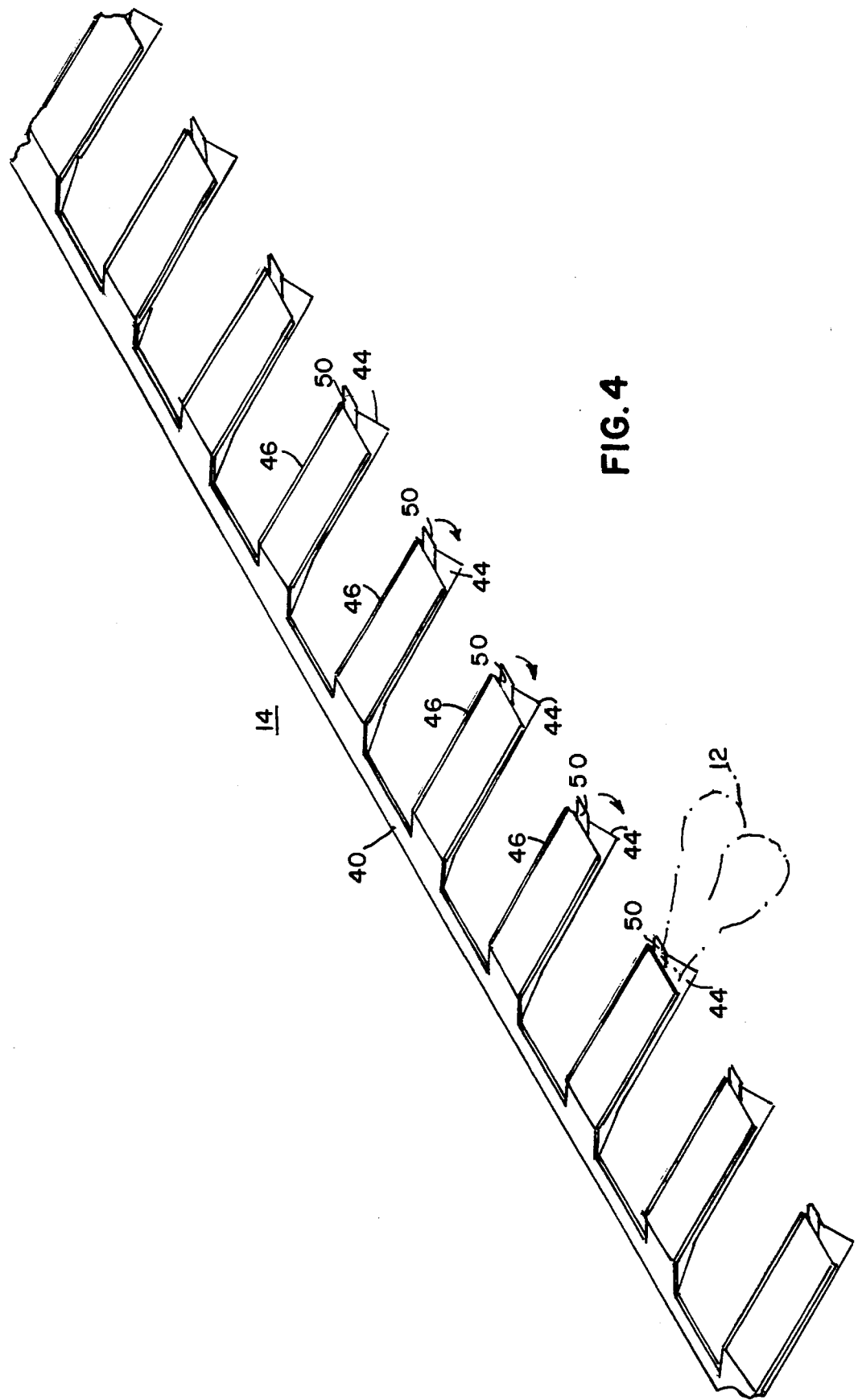
FIG. 4 is a view of the device shown in FIG. 3, in a closed configuration, securing and shielding a shrimp therein.

Other embodiments of the elongated bar 14 and enclosures, are shown in FIGS. 3 and 4, which elongated bar 14 may be made from a thin flat sheet of foldable flexible plastic 40 or the like, having a central extended bar portion 42 with spaced apart transversely disposed formed V-shaped trough elements 44 and correspondingly aligned cover portions 46 on the opposite side of the bar 14. The elongated bar 14 and/or the cover portions 46 may be folded onto the trough shaped support portion 44 once a shrimp has its tail placed therewithin. A tab 50 on the distal most end of the cover 46 may be wedged into the trough 44 to help secure a foodstuff therein.

Figure 5:
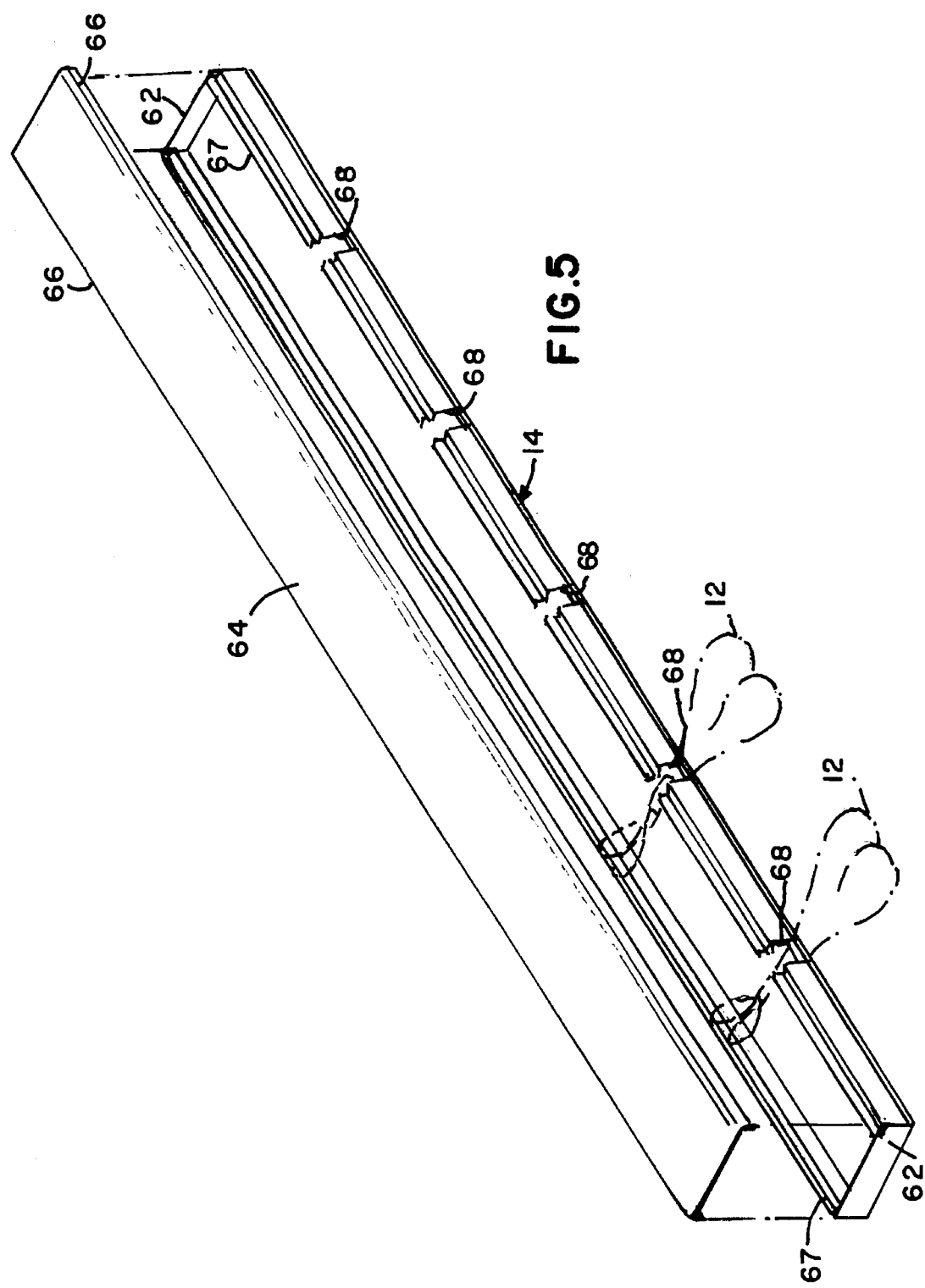
FIG. 5 is an exploded perspective view of a further embodiment of the enclosure bar having an enclosure cap which snaps matingly thereover.
Figure 6:
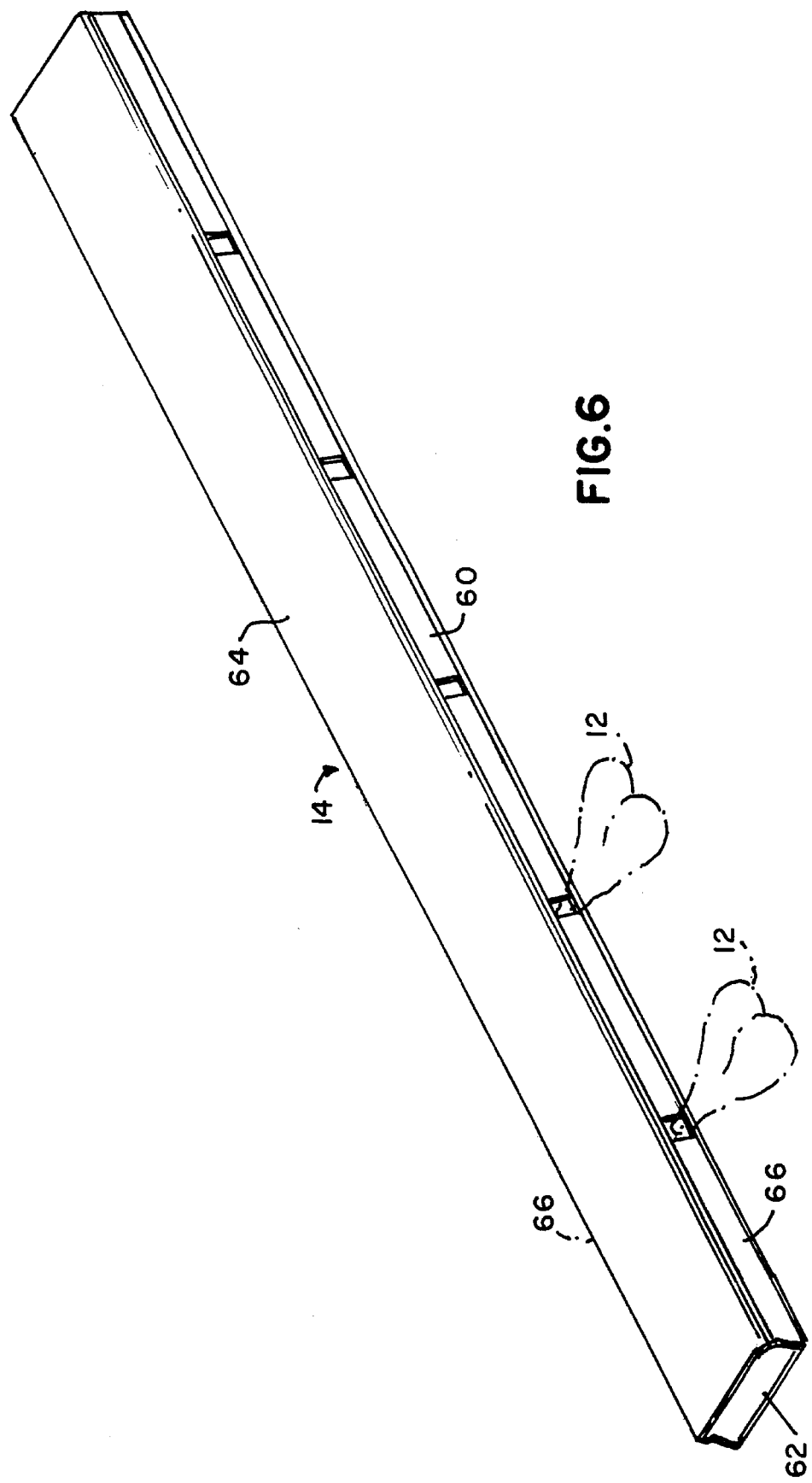

In a further preferred embodiment, as shown in FIGS. 5 and 6, the elongated bar 14 comprises a trough or lower housing 60 preferably of extruded material such as plastic or the like. The housing 60 is of generally "U" shape in cross-section. The housing 60 may have end wall inserts 62 secured to each end of the housing 60, as shown in FIG. 5. A housing cover 64, of elongated configuration, has curved side edges 66 which are sized and configured to permit it to be snapped onto the upper peripheral edge 67 of the housing 60, in a manner as shown in FIG. 6. The housing 60 has a plurality of spaced apart slots 68, on at least one side thereof, as shown in FIG. 5. The slots 68 are just wide enough and high enough (about 0.25 cm by about 0.5 cm) to snugly and securely fit the tail portion of a shrimp 12 therein. The housing 16 with the cover 64 therefore keep the foodstuff (shrimps) 12 in spaced apart alignment, a portion of them (the tails) being covered and kept free of coating of subsequent food processing and food handling concerns.

Figure 7:
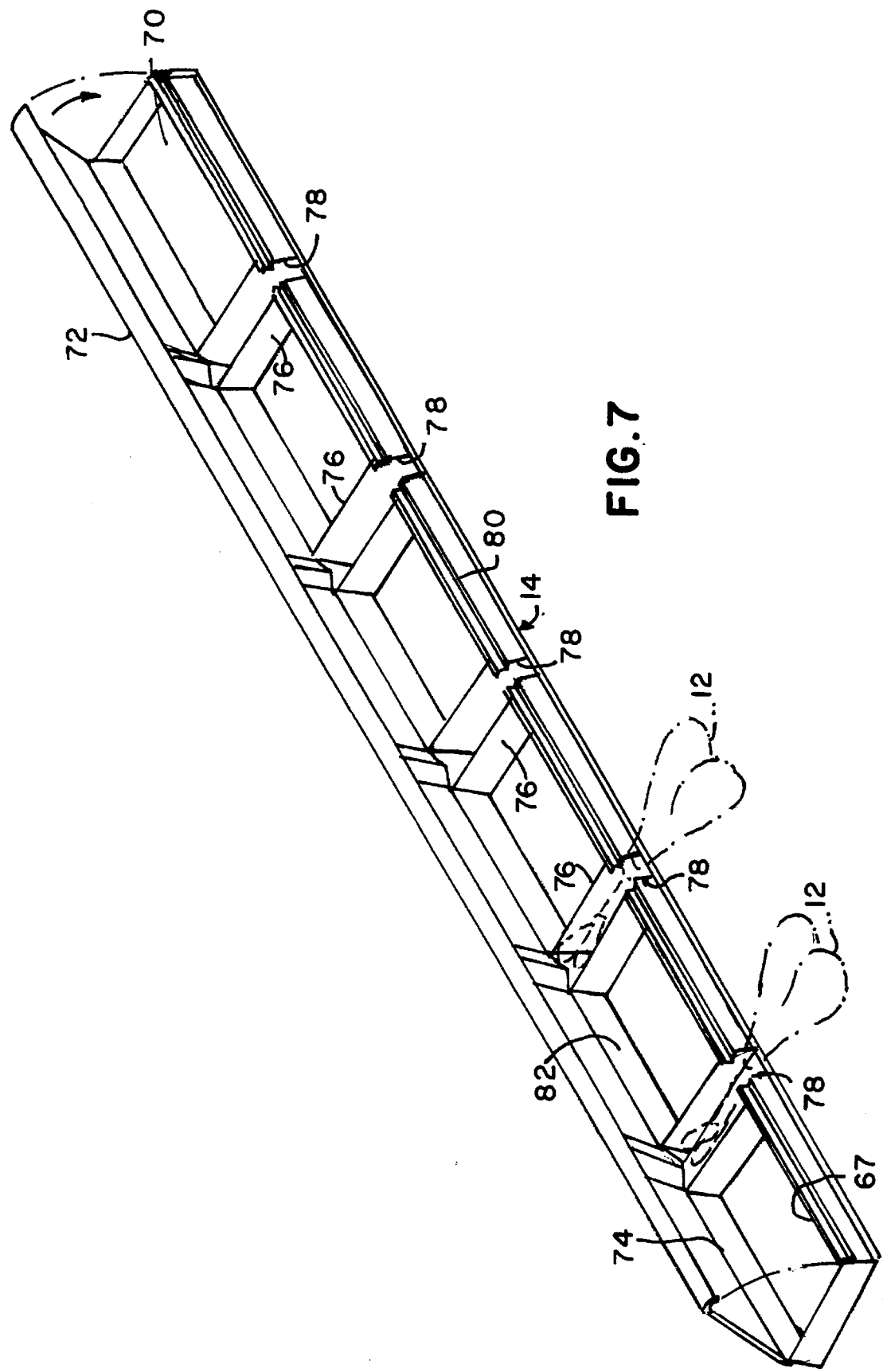
FIG. 7 is a perspective view of another preferred embodiment of the enclosure bar.

A further preferred embodiment of the elongated bar 14 is shown in FIG. 7, wherein the trough-shaped housing 70 has a cover 72, similar to the embodiment shown in FIGS. 5 and 6, except that the cover 72 is hingedly attached along one elongated edge 74 to permit the cover 72 to be snapped onto the housing 70. The housing 70 may also have narrow box-like compartments 76 which mate within the housing 70. Each compartment 76 has an open end which is in alignment with its own slot 78 in the sidewall 80 of the housing 70. It is to be noted that the slots 78 also could be arranged in both sides 80 and 82 of the housing 70.

Thus what has been shown is a novel and unique arrangement for processing of foodstuffs such as shrimp, portions of which have to be maintained free of the process being applied to the rest of the foodstuff. The present arrangement permits a minimum of manual handling of the foodstuffs while also permitting the support device to define the packaging arrangement for that foodstuffs and their subsequent shipping.

I claim:

1. A support arrangement for holding a plurality of foodstuffs in parallel alignment and partial enclosure during a food processing operation, comprising:

an elongated bar;

a plurality of enclosure members attached to said elongated bar, each of said enclosure members arranged to securely hold and enclose at least part of one of said foodstuffs during said foodstuff processing operation, and said enclosure members being formed from a generally planar element which may be folded around said foodstuff.

2. A support arrangement as recited in claim 1, wherein said planar element is arranged to be rolled up in a cylindrical shape to enclose at least a part of said foodstuffs.

3. A support arrangement as recited in claim 2, wherein said generally planar element has a plurality of serrations thereon to facilitate gripping of said foodstuffs within said enclosure.

4. A support arrangement as recited in claim 1, wherein said elongated bar has at least two opposite side edges, and each side edge has a panel extending therefrom, which opposed panels are foldable with respect to one another to form an enclosure member.

5. A support enclosure for holding a plurality of foodstuffs in parallel alignment and partial enclosure during a processing operation, comprising:

an elongated bar;

a securement arrangement comprising a part of said elongated bar for securing said foodstuffs with respect to said elongated bar and for covering, at least partially, said foodstuffs, during the processing operation, said securement arrangement comprising a trough-like enclosure which is arranged to receive a portion of said foodstuffs.

6. A support enclosure as recited in claim 5, wherein said trough-like enclosure has a plurality of slots therein, said slots in said enclosure arranged to securely hold said foodstuffs therethrough.

7. A support enclosure as recited in claim 5, wherein said trough-like enclosure has an arrangement of side walls, a lower portion bridging said side walls, and a cover, to provide said trough-like enclosure with protection on its upper side during any food processing operation steps of said bar and foodstuffs therewith.

8. A support enclosure as recited in claim 7, wherein said cover has an elongated edge by which it is attached to one of said side walls.

9. A support enclosure as recited in claim 7, wherein said cover is removably attached with respect to said elongated bar.

10. A support enclosure as recited in claim 7, including a box-like housing seated within said enclosure having an open end which is in alignment with said slot in said walls, to individually hold a foodstuff therein.

11. A method of processing a plurality of individual foodstuffs in a manner so as to keep said foodstuffs in proper alignment with one another, and at least partially covered from the processing operation, comprising:

providing an elongated bar for holding said foodstuffs in alignment;

placing the foodstuffs in a plurality of slot securement arrangements disposed in said elongated bar; and placing said elongated bar with said foodstuffs therewith onto a conveyor line for processing.

12. The method recited in claim 11, including the step of:

processing said foodstuffs in a series of food treating operations, while said foodstuffs extend outwardly away from said elongated bar, a portion of each of said foodstuffs also being enclosed within said elongated bar.

13. The method recited in claim 12, including the step of:

shipping said processed treated foodstuffs while they are still secured with respect to said elongated bar.

14. The method recited in claim 11, including the step of:

covering said elongated bar with an elongated cover to enclose the portions of said foodstuffs within said elongated bar from food processing operations and to secure said foodstuffs therein for subsequent handling and shipping.

15. The method recited in claim 14, including the step of:

pivoting said elongated cover about an elongated edge by which it is formed with said elongated bar, into a snap-on engagement over said enclosure bar to hold said cover thereon.

* * * * *